United States Patent [19]
Alinari

[11] 3,892,131
[45] July 1, 1975

[54] INSTRUMENT FOR INDICATING THE DURATION AND DEPTH OF DECOMPRESSION STOPS IN DIVING

[75] Inventor: Carlo Alinari, Turin, Italy

[73] Assignee: Under Sea Industries, Inc., Compton, Calif.

[22] Filed: Oct. 19, 1973

[21] Appl. No.: 408,131

[30] Foreign Application Priority Data
Nov. 29, 1972 Italy .................. 70757/72

[52] U.S. Cl. .................. 73/432 R; 73/411
[51] Int. Cl. .................. G06g 5/00
[58] Field of Search .......... 73/432 R, 411, 414, 418, 73/432 A, 432 AD, 432 CR, 299, 300

[56] References Cited
UNITED STATES PATENTS

| | | | |
|---|---|---|---|
| 3,121,333 | 2/1964 | Alinari | 73/411 |
| 3,377,860 | 4/1968 | Masters | 73/291 |
| 3,457,393 | 7/1969 | Stubbs et al. | 73/432 R UX |
| 3,463,015 | 8/1969 | Gulino et al. | 73/432 R |
| 3,681,585 | 8/1972 | Todd | 73/432 R UX |
| 3,710,625 | 1/1973 | Borom et al. | 73/432 R |
| 3,757,586 | 9/1973 | Borom | 73/432 R |
| 3,759,101 | 9/1973 | Borom et al. | 73/432 R X |
| 3,759,109 | 9/1973 | Johnson et al. | 73/432 R |
| 3,777,573 | 12/1973 | Alinari | 73/432 R |

Primary Examiner—Richard C. Queisser
Assistant Examiner—Joseph W. Roskos
Attorney, Agent, or Firm—Sughrue, Rothwell, Mion, Zinn and Macpeak

[57] ABSTRACT

An instrument is provided to indicate the depth and duration of decompression stops during ascent to the surface. A Bourdon-type pressure gauge is provided with a pointer and a non-elastic mechanical brake connected thereto to afford a truly aperiodic motion of the pointer having the same semi-period as the human tissue being simulated. A plurality of such tissue simulators, each representing a different type of tissue, may be mounted in a common case and adjustable indicators are provided for each simulator to compensate for the elapsed time between dives.

10 Claims, 8 Drawing Figures

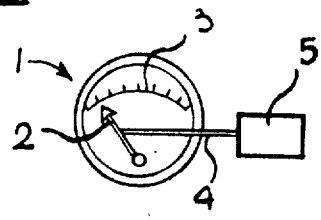
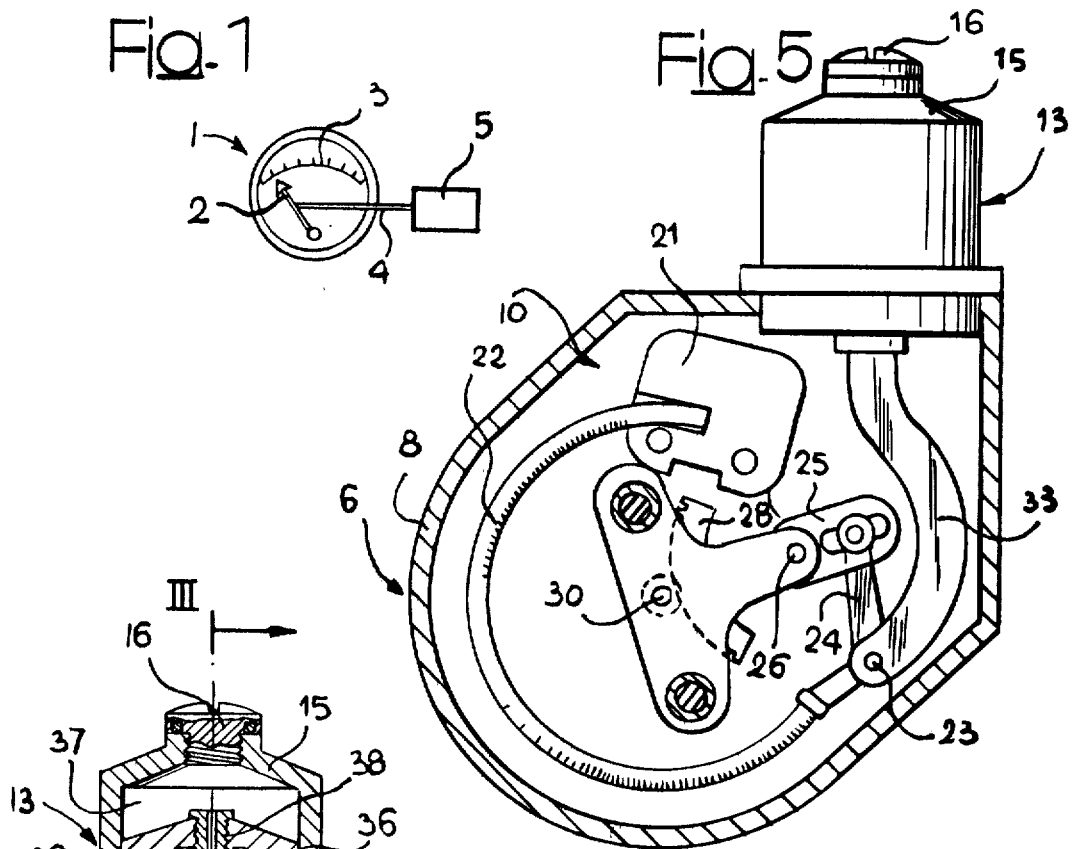
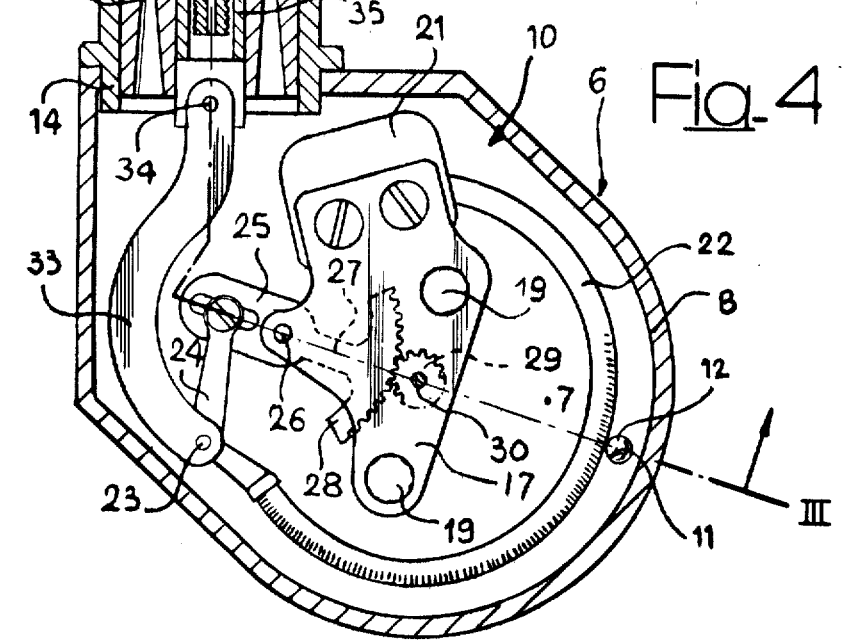

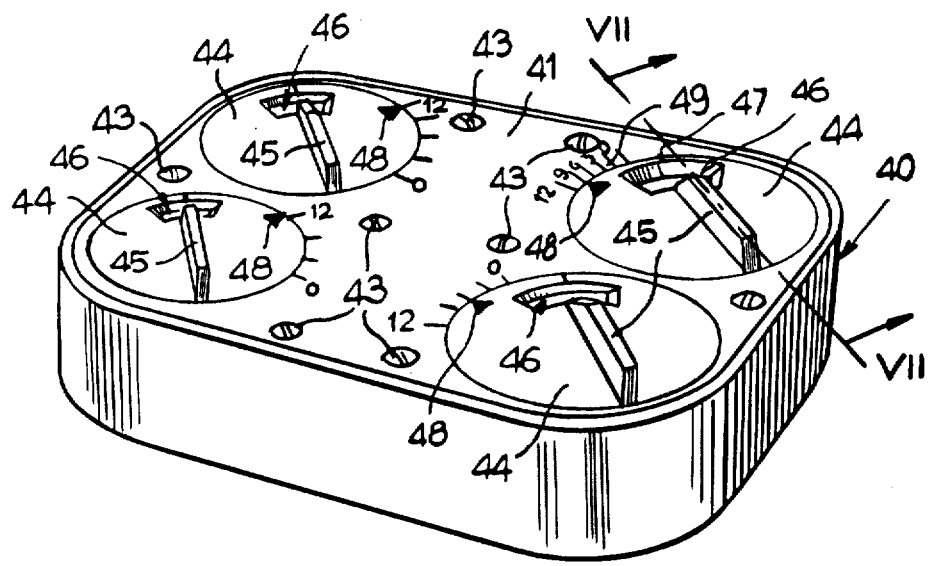
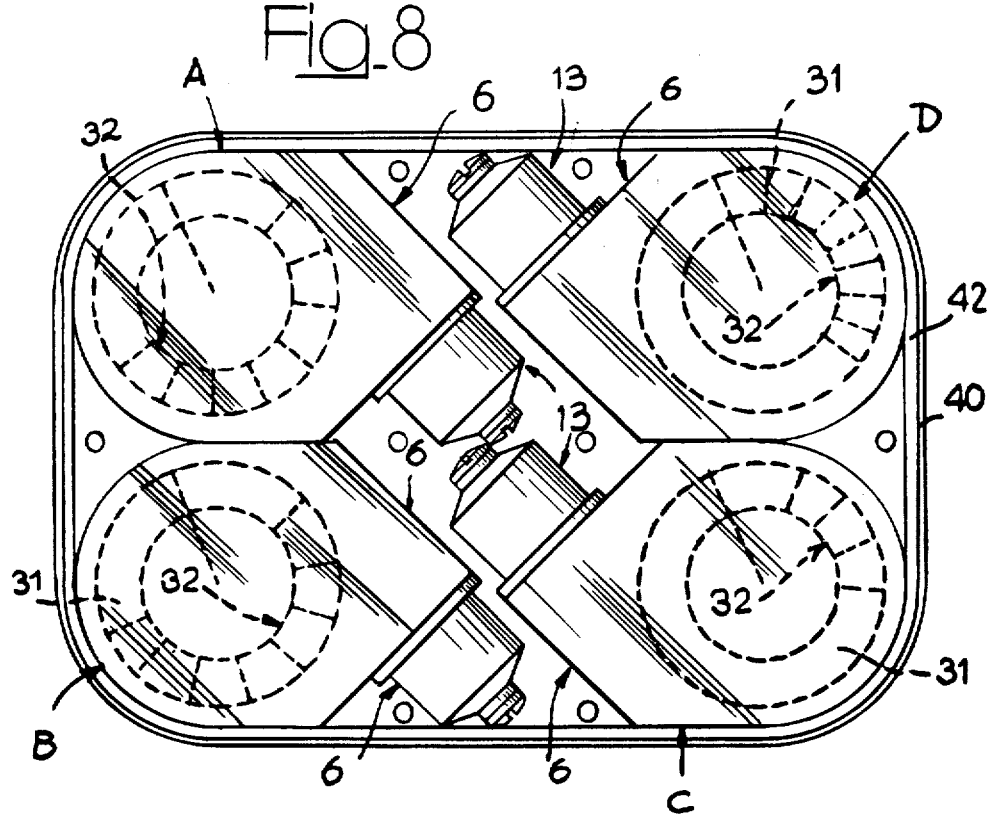

INSTRUMENT FOR INDICATING THE DURATION AND DEPTH OF DECOMPRESSION STOPS IN DIVING

BACKGROUND OF THE INVENTION

The invention relates to instruments for use during diving effected with compressed air, adapted to indicate the depth of the decompression stops which must necessarily be made in ascending from a certain depth to the water surface, and to indicate the duration of said stops.

It is known that during diving effected with compressed air, the tissues of the human body become enriched with nitrogen according to an exponential law, the nitrogen content in the tissue being a function of the depth and duration of diving. The decompression stops to be effected during ascent are intended to permit controlled elimination of nitrogen by the tissues of the organism in order to avoid the well known highly objectionable problems of bends, due to the release of nitrogen bubbles in the tissues.

In order to determine said decompression stops suitably complied tables are employed which, with the aid of a depth meter and a clock, assist in determining the depth and duration of the successive stops to be effected during ascent as a function of the maximum depths reached and time spent at said depths.

In addition to being inconvenient in use, such tables are impracticable, for the data contained therein relates to given times spent at constant depths, whereas the diver in practice continuously change his depth.

The tables are calculated upon the assumption that human tissues absorb nitrogen and eliminate it according to exponential laws expressed by the formula $p = P e^{-kt}$ wherein $k$ is the desorption or absorption constant, P is the external pressure and $e$ the basis of natural logarithms, and $t$ is the time of dwelling.

A human tissue categorized on the basis of its semiperiod T, that is the time in minutes required for the nitrogen pressure $p$ in the tissue when subjected to an external pressure P, to reach the value P/2. In calculating the tables this semiperiod is assumed to be equal and constant both in absorption and desorption.

Moreover, in calculating the tables specific tissues are considered which are well defined and have semiperiods of 5, 10, 20, 40, 80, 120, 160, 200, 240 minutes.

Still for calculating the tables, the various decompression depths are calculated on the "critical ratio" principle, established by Haldane in 1908, according to which a tissue can ascend to the water surface without the occurrence of the bends up to a depth such as to meet the relation:

$$\frac{\text{absolute nitrogen pressure in the tissue}}{\text{absolute pressure at the depth considered}} \leq \rho$$

wherein $\rho$ is the critical ratio.

Of course, the value of the critical ratio is not constant but varies with the depth considered and is dependent upon the type of the tissue. The mean value of $\rho$ is about 2/1.

Further instruments are known which automatically indicate the depth and duration of decompression stops. They are based on the use of one or more analog devices which simulate the behavior of one or more human tissues. Each of these devices is generally formed by two chambers filled with a gaseous fluid, one of which chambers is deformable and ambient-pressure responsive and is connected by a calibrated conduit with a rigid chamber provided with means adapted to measure the internal pressure.

It can easily be shown that an instrument of this construction cannot actually be considered as a true analog of tissue behavior. Its absorption and desorption properties do not accurately follow the law of $p = P e^{-kt}$ and do not therefore possess a well defined semiperiod varying with time and following a different law on absorption and desorption, respectively.

Applicant proposed by a prior patent a two-chamber apparatus, the chambers of which are filled with a noncompressible liquid and are interconnected by a calibrated conduit. In this apparatus, the first chamber is deformable and subjected to ambient pressure, the second chamber being likewise deformable, inasmuch as it encloses a springbiased piston having linear deformation characteristics. This apparatus can actually be considered as a tissue analog, inasmuch as the charging and discharging or absorption and desorption curve of the system coincide and are theoretically the desired ones meeting the formula $p = P e^{-kt}$.

However, this apparatus is highly sensitive to friction due to the piston seals. Moreover, the two-chamber arrangement entails considerable construction complications and a relative bulkiness.

SUMMARY OF THE INVENTION

The object of the invention is to provide an instrument adapted to indicate the depth and duration of decompression stops in diving which is simpler in structure and use and reduced in size compared with known apparatus.

The instrument according to this invention includes at least one analog tissue simulator composed of a tightly sealed chamber filled with liquid, having at least part of its casing deformable under the action of external pressure; a pressure gauge provided with a pointer, such as of the Bourdon type, within said chamber and a non-elastic mechanical brake, such as a hydraulic or electric brake, likewise enclosed by said chamber, acting on said gauge and powerful enough to afford a truly aperiodic motion of the gauge pointer and having the same semi-period as the human tissue to be imitated.

Further characteristic features and advantages of the invention will appear from the following description referring by way of a non-limiting example to embodiments of the invention shown on the accompanying drawings.

BRIEF DESCRIPTION OF THE DRAWINGS

FIG. 1 is a diagrammatic plan view of an instrument built according to the principle of the invention, FIG. 6 is a perspective view of an instrument including 4 tissue simulators of the type shown in FIGS. 2 through 5, FIG. 8 is a plan view showing the instrument according to FIGS. 6 and 7, the cover being removed.

DETAILED DESCRIPTION OF THE INVENTION

Figure 3:
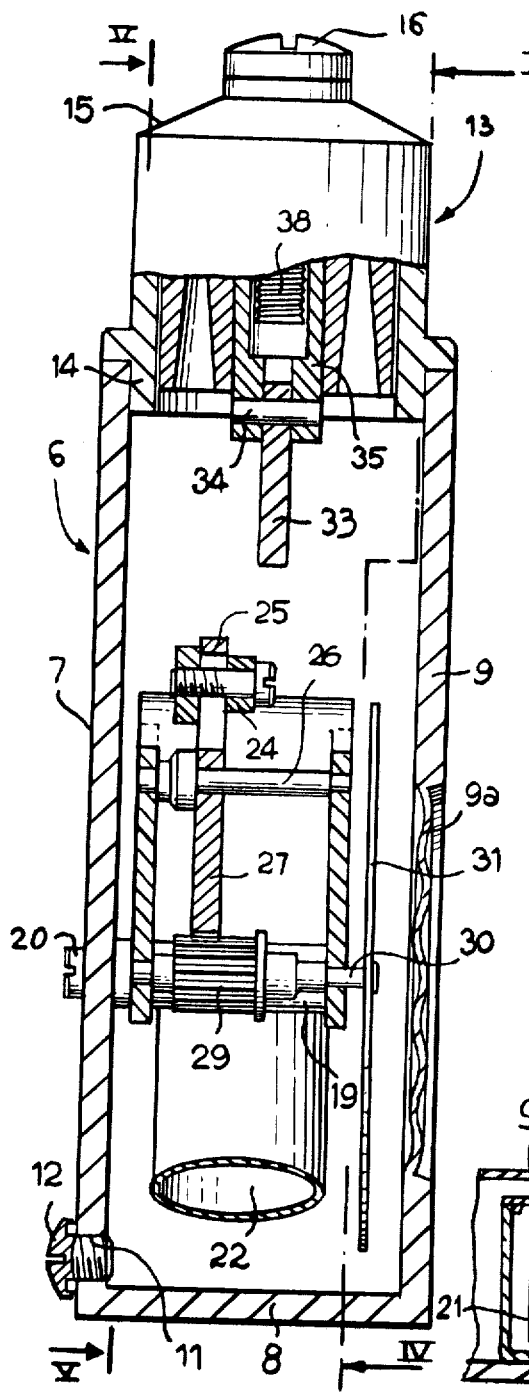
FIG. 3 is a sectional view on line III—III of FIG. 4, FIGS. 4 and 5 are sectional views on lines IV—IV and V—V of FIG. 3.

The instrument shown in FIG. 1 comprises a depth meter 1, the movable pointer of which cooperates with a graduated scale 3. The pointer 2 is connected by a rod 4 or any other suitable connecting means with a braking device 5 comprising a non-elastic mechanical or electric brake, powerful enough to afford a truly aperiodic motion and having the same semi-period as the human tissue to be imitated.

In the embodiment shown in FIGS. 2 through 5 the instrument simularly comprises a single analog tissue simulator having a tightly sealed casing comprising a bottom wall 7, a sidewall 8 securely fixed to the bottom and a cover 9 parallel to the bottom secured to the sidewall 8. The bottom wall 7 and cover 9 are of the same shape with a partial semi-circular contour and the cover 9 includes a thinner corrugated central portion 9a which is resiliently deformable. All parts of the casing 6 are conveniently made of transparent plastics.

The internal chamber 10 of the casing 6 communicates with the outside through a hole 11 closed through the interposition of an annular seal by a tapped plug 12. The chamber 10 further communicates with the cylindrical interior of a tumbler-shaped extension 13 formed by injection molding of a plastics similar to that of the parts of the casing 6. The extension 13 is secured to the sidewall 8 of the casing 6 at an opening which accommodates the open end 14 of said extension.

The other end of the extension 13 is closed by a bottom 15 formed with a central hole closed by a tapped plug 16 likewise provided with an annular seal.

The chamber 10 accommodates a support comprising a pair of plates 17, 18 extending parallel to each other and to the bottom wall 7. The plates are speaced by a pair of sleeves 19 secured by screws 20 to the bottom wall 7 of the casing 6. Since the screws 20 extend through the bottom wall 7, the regions at which they enter the interior of the casing 6 are sealed by sealing members (not shown).

The plate 17 nearer the cover 9 has secured thereto a block 21 formed with a recess into which one end of the Bourdon tube 22 is fitted and retained. The Bourdon tube is sealed at both ends and contains air or is evacuated. The opposite end portion of the tube 22 is articulated to the fulcrum 23 perpendicular to the plates 17, 18, carried by the free end of the arm 24 secured to a branch 25 of a beam fixedly connected with a shaft 26 parallel to the fulcrum 23 and rotatably mounted in recesses in the plates 17,18. The other branch 27 of the beam carries a toothed section 28 meshing with a pinion 29. The latter is keyed to a spindle 30 extending parallel to the shaft 26, rotatably mounted in recesses in the plates 17, 18 and coaxial with the center of curvature of the semicircular parts of the contour of the bottom 7 and the cover 9. One end of the spindle 30 extends beyond the plate 17 towards the cover 9 and carries a disc 31 fixedly secured thereto, the face of which turned towards the cover 9 is provided with a graduated scale 32 adapted to cooperate with a stationary pointer 32a engraved in the cover 9.

The graduation 32 is formed by a plurality of radial lines separated by angular spacings corresponding to given pressures which for each typical tissue are the same as adopted in calculation of the tables, a numeral being marked between each pair of consecutive lines, the meaning of which will be explained hereinafter.

Of course, the disc 31 on the spindle 30 can be replaced by a stationary pointer in the form of a needle cooperating with a stationary scale provided on the transparent cover 9, formed according to the same criteria as the scale on the disc 31.

The fulcrum 23 carried by the arm 24 has articulated thereto one end of a rigid curved link 33, the other end of which is rotatably mounted by means of a pin 34 on the lower bifurcated end portion of a tube 35 which is preferably made of the same synthetic resin as the casing 6 and extension 13.

The tube 35 is fitted and glued into a cylindrical recess formed in the portion turned towards the open end of the extension of a piston 36 slidably mounted with a small clearance in the cylindrical chamber of said extension molded from the same material as the tube 35.

The cylindrical recess accommodating the tube 35 coaxially with the piston 36 communicates with a space 37 defined between the bottom 15 of the extension 13 of the casing 6 and the top of the piston 36 through a tapped through hole formed in the top of the piston 36, coaxial with the latter and smaller in diameter than the tube 35.

A flanged bushing 38 is screwed into said hole and reaches into the tube 35. The bore of the bushing is calibrated, the constant diameter of said bore and the length of the bushing being selected according to special criteria which shall be explained hereinafter.

The chamber 10 and cylindrical interior of the hollow extension 13 are filled with a fluid, such as the silicone fluid manufactured by Dow Corning 200 with a viscosity of about 60,000 centistokes at 24°–25°C. Filling is effected through the openings normally closed by plugs 12 and 16 and is completed without air residues in order to provide a non-elastic kinematic system the parts of which perform aperiodic motions on rising and sinking of the pressure externally of the casing 6 and extension 13 thereof.

Moreover, by virtue of said fluid the piston 36 acts as a brake member for the displacement of the disc 31 carrying the graduation 32 resulting from a rise and/or fall in the pressure in the medium in which the instrument or tissue element is arranged.

The structure of the parts and their mutual cooperation combined with the characteristics of the silicone fluid filling the chamber 10 and the inside of the extension 13 are such that the movements of the disc 31 represent the exchange of nitrogen between a human tissue distinguished by a given semiperiod, such a semiperiod $T = 10, 20, 40, 80$ minutes or more and the ambient pressure on variation of the latter.

It has been found that for the purpose stated above, a piston 18mm in diameter should conveniently be slidably mounted in the cylindrical hollow interior of the extension 13 with a clearance amounting to 0.05mm. Practical tests have shown that the ratio between the length of the bushing 38, the bore of its central through hole 39 and type of human tissue to be imitated by the instrument, may be as shown by the following table, wherein T is the value of the semiperiod in minutes, $l$ is the length of the bushing 38 and $O$ the diameter of the bore of the hole 39 which is constant through out the bore length.

| T minutes | 1 mm | 0 mm |
| --- | --- | --- |
| 10 | 5.6 | 0.7 |
| 20 | 12 | 0.7 |
| 40 | 4.8 | 0.5 |
| 80 | 11 | 0.5 |

The operation of the instrument and its use during diving are as follows.

Figure 2:
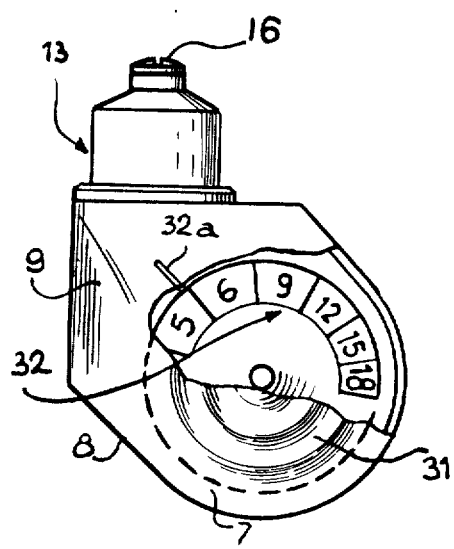
FIG. 2 is a plan view of an instrument comprising a single tissue simulator according to a first embodiment of the invention.

On diving the disc 31 rotates counterclockwise, FIG. 2, and indicates in front of the stationary pointer 32a one of the numerals marked between each two consecutive radial lines provided near the external periphery of the disc 31. This means that for safe ascent for the type of tissue to which the instrument bears an analogy, the decompression stop should be effected at the depth expressed in feet or meters depending upon the type of graduation defined by the abovementioned numeral. The dwell at said depth should persist till the spacing of the radial lines between which the abovementioned numeral is situated no longer coincides with the stationary pointer 32a. Since the disc 31 has rotated clockwise during decompression, the next spacing between two radial dashes, having thereon a lower numeral than the preceding one, will be in front of the stationary pointer 32a. This numeral expresses the depth at which the diver shall effect the next decompression stop.

The structure described with reference to FIGS. 2 through 5 is well suited for designing composite instruments incorporating a plurality of individual tissue simulators, each calibrated to supply on variation of the external pressure, indications reproducing those which would be obtained from the same characteristic curve of nitrogen absorption and desorption applicable to a given tissue of the human body.

Figure 7:
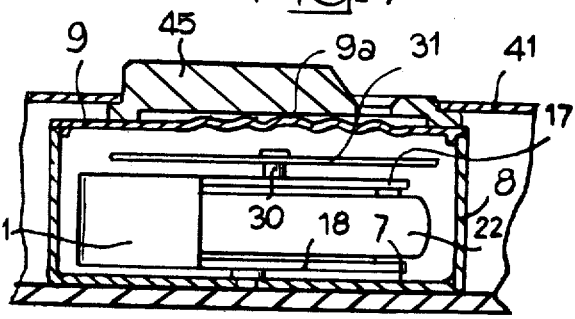
FIG. 7 is a sectional view on line VII—VII of FIG. 6.

An instrument of this kind shown by way of example in FIGS. 6 through 8 comprises a battery of four tissue simulators identical in structure and size but provided with respective bushings 38 differing in bore and/or length so as to indicate the deviation and depth of the decompression stops applicable to four different types of human tissue.

The instruments A, B, C and D, FIG. 8, are arranged within a stiff casing 40, either of metal or molded from a thermosetting synthetic resin so as to be of the smallest overall size. The casing is closed by a metal cover 41 the edge of which bears on a rebate 42 on the lateral wall of the casing 40, the cover being connected with the casing bottom by a plurality of screws 43.

The cover 41 is formed with four circular openings coaxial with the pivots carrying the discs 31 of the tissue simulators A–D. Flanged discs 44 are fitted into said openings from the face of the cover 41 facing the bottom of the casing 40, and are provided with diametrical ribs 45 for ease in rotating the flanges.

Each disc 44 is formed with an arcuate slot 46 so spaced from the center of the disc 49 and of width such that the graduation on the disc 31 of its respective tissue simulator can be visualized therethrough.

A pointer 47 is engraved in the middle of each slot 46 in the peripheral portion of the disc 44, and performs the same function as the pointer 32 in the embodiment described with reference to FIGS. 2 through 5. Each disc moreover carries a further pointer 48 adapted to cooperate with a graduation 49 provided on the outer face of the cover 41 at the periphery of each of the openings receiving the discs 44. The divisions of the graduation are numbered 0 to 12 and serve for positioning the stationary pointer 47 with respect to the scale on the discs 41, care being taken of the period of time between one dive and the next. Where said period exceeds 12 hours, the pointer 47 is brought into register with the mark numbered 12 on the graduation 49, according to which, when the period is of less than 12 hours, the pointer 47 is brought into register with the mark of the graduation 49 distinguished by the number of said hours.

Of course, within the principle of the invention, details can be widely varied with respect to the Example described and shown without departing from the spirit of the invention.

Thus, for example, the brake retarding the movement of the pointer of the instrument could be of a configuration other than described. The link 37 can be connected with the piston through the interposition of a rod rigidly secured to the piston and extending through a bottom closing the end of the extension 13 fitted into the casing 6. In the latter case, the chamber 10 can be filled with a fluid other than the fluid within the hollow interior of the extension 13.

According to a further modification the brake can be in the form of a bladed rotor which rotates in a cylindrical container filled with a viscous fluid and operatively connected to the shaft carrying the movable pointer of the instrument. According to a still further modification, said rotor can be formed by one or a plurality of blades directly secured to the pointer which moves in an enclosure filled with a viscous liquid. In both these cases the nature of the law of motion of the pointers with respect to the stationary graduation or of the members carrying the graduations with respect to the stationary pointer will depend upon the viscosity characteristics of the liquid filling the enclosures in which the bladed rotors are carried.

Finally, structures are possible in which the shaft carrying the movable pointer has a damper in the form of a rotary disc attached to the shaft and acted upon by a permanent magnet.

What is claimed is:

1. An instrument for indicating the depth and duration of decompression pauses during diving, comprising at least one analogic tissue simulator comprising a casing defining a fluid-tight sealed chamber filled with liquid, said casing having at least one portion deformable under the action of external pressure; pressure gauge means provided with a pointer contained in said chamber and mechanical non-elastic brake means contained in said chamber, and operatively connected to said pressure gauge to effect a truly aperiodical movement of the pointer of the pressure gauge means and having a semiperiod similar to that of the human tissue to be imitated.

2. An instrument as defined in claim 1 wherein said brake means comprises a piston slidably mounted with a slight clearance in an internal chamber communicating with said sealed chamber enclosing said pressure gauge means and defined within a cylindrical cup-shaped extension of said casing, said pressure gauge means comprising a Bourdon tube having a fixed end and a movable end, a rigid link articulated at one end to said piston and fulcrumed at its other end to the movable end of the Bourdon tube; the said piston being formed with an axial bore extending through its top and calibrated to exert on the movable end of the Bourdon tube a braking action such that the displacements of the pointer of the instrument are related to the variation with time of the absorption and desorption of nitrogen by a particular type of human tissue during diving.

3. An instrument as defined in claim 2, wherein the chamber containing said pressure gauge means and the chamber in the said extension are filled with a silicone fluid of a viscosity of about 60,000 C.S.K. (centistokes) at 24°–25°C.

4. An instrument as defined in claim 2 wherein a threaded aperture is formed in said piston, said axial bore being disposed in an externally threaded bush screwed into said aperture, the diameter of the bore and the length of the bush being selected so that the displacements of the pointer of the instrument are related to the variation with time of the absorption and desorption of nitrogen by a specific type of human tissue during diving.

5. An instrument as defined in claim 2, wherein the movable end of the Bourdon tube is connected by connecting means to a rotatable pivot carrying a disc arranged in proximity to a transparent wall of said casing; said wall carrying a stationary pointer adapted to cooperate with graduations provided adjacent to the disc periphery of the disc face turned towards said transparent wall; said graduations comprising a plurality of spaced radial divisions and numerals provided between each pair of consecutive divisions and numerals provided between each pair of consecutive divisions, said numerals indicating depths at which the decompression pauses should be effected depending upon the depths reached during diving, duration of the latter and time elapsed since the preceding dive.

6. An instrument as defined in claim 5, further comprising an external container box having a cover on one side, said simulator being disposed in said box with said transparent wall disposed adjacent said cover; said cover being formed with an opening coaxial with the disc carrying the graduations; a second disc rotatably mounted in said opening and having a peripheral flange extending over the side of the cover turned towards the inside of the casing; said second disc being made of a non-transparent material and being formed with an aperture in the form of a circular segment spaced from its center so that it can be superposed over the graduations on the disc operated by the Bourdon tube; one edge of said aperture being concentric with the second disc and being provided with a first pointer adapted to cooperate with the graduations on the first-mentioned disc; said second disc being provided on its periphery with a second pointer adapted to cooperate with graduations on the cover of the casing in proximity to the edge of the opening accommodating said second disc; said graduations having divisions numbered from 0 to 12, the first number indicating the position that the second pointer on the second disc should take when one dive directly follows a preceding dive, the last number denoting the position that the second pointer on the second disc should take when the time interval between consecutive dives exceeds 12 hours.

7. An instrument as defined in claim 6, further comprising a plurality of said analog tissue simulators each having a different characteristic semiperiod, arranged in said container box, said cover having additional identical apertures and discs for each of said simulators.

8. In a decompression meter adapted to be carried by a diver for exposure to substantially the same ambient pressure that acts upon the body of a diver;

1. a transducer having an output and an input for converting pressure as an input signal to a function as an output signal;
2. a support for said transducer having means for subjecting the input of said transducer to ambient pressure;
3. a readout device connected to said transducer output and
4. aperiodic delay means also coupled to said transducer output and thereby to said readout device for retarding the reading of said readout device with a predetermined half period to simulate the absorption characteristics of body tissue.

9. In a decompression meter as set forth in claim 8 wherein said readout device comprises a mechanical scale and pointer and wherein said delay means comprises a dashpot.

10. In a decompression meter as set forth in claim 9 further comprising a replacable control plug for said dashpot having a pre-sized port opening on opposite sides thereof.

* * * * *